US009466995B2

(12) United States Patent
Groat et al.

(10) Patent No.: US 9,466,995 B2
(45) Date of Patent: Oct. 11, 2016

(54) SELF-CONTAINED AUTOMATIC BATTERY CHARGING SYSTEMS AND METHODS

(71) Applicant: Stored Energy Systems, a Limited Liability Company, Longmont, CO (US)

(72) Inventors: Timothy Groat, Berthoud, CO (US); Kyle Miller, Denver, CO (US); John Flavin, Golden, CO (US)

(73) Assignee: Stored Energy Systems, a Limited Liability Company, Longmont, CO (US)

( * ) Notice: Subject to any disclaimer, the term of this patent is extended or adjusted under 35 U.S.C. 154(b) by 169 days.

(21) Appl. No.: 14/536,368

(22) Filed: Nov. 7, 2014

(65) Prior Publication Data

US 2015/0123600 A1    May 7, 2015

Related U.S. Application Data

(60) Provisional application No. 61/901,104, filed on Nov. 7, 2013.

(51) Int. Cl.
*H02J 7/00* (2006.01)
*H02M 1/42* (2007.01)
(Continued)

(52) U.S. Cl.
CPC .............. *H02J 7/0042* (2013.01); *H02J 7/007* (2013.01); *H02J 7/02* (2013.01); *H02M 1/4258* (2013.01);
(Continued)

(58) Field of Classification Search
CPC ...... H02J 7/0042; H02J 7/0052; H02J 7/007; H02M 1/4208
USPC .......................................................... 320/107
See application file for complete search history.

(56) References Cited

U.S. PATENT DOCUMENTS 5,140,269 A    8/1992   Champlin
5,184,025 A *  2/1993   McCurry .................. G06F 1/28
                                                              307/48
(Continued)

FOREIGN PATENT DOCUMENTS

CN    102253348 B    10/2012

OTHER PUBLICATIONS

Marinco—Charge Pro Battery Chargers, www.marinco.com, Milwaukee, WI, copyright 2014, 4 pp.
(Continued)

*Primary Examiner* — Sun Lin
(74) *Attorney, Agent, or Firm* — James A. Sheridan; Sheridan Law, LLC (57) ABSTRACT

Disclosed herein is an embodiment of a charger having a power printed circuit board (PCB) that enables an alternating current (AC) power to flow into a self-contained automatic battery charging system. A first switchmode converter converts an AC input power into a direct current (DC) power thereby to provide an active power factor correction to obtain an improved power factor. The first switchmode converter comprising a high frequency isolation transformer which provides an electrical isolation between a primary circuitry and a secondary circuitry of the self-contained automatic battery charging system. A second switchmode converter connected to a DC output from the first switchmode converter regulates system output voltage and limits system output current to an electrical load. The DC output is connected to a battery and/or another electrical storage device to be charged and/or to a parallel-connected DC load to be powered. An optional accessory PCB is electrically connected to the power PCB, and they are housed in a same chassis or enclosure. The optional accessory PCB provides optional features including an LCD, alarm output relay(s), and/or a controller area network bus (CANbus) interface. Other embodiments are also disclosed.

22 Claims, 10 Drawing Sheets

(51) Int. Cl.
*H02M 7/00* (2006.01)
*H02J 7/02* (2016.01)
*H02M 1/00* (2006.01)

(52) U.S. Cl.
CPC ............ *H02M 7/003* (2013.01); *H02J 7/0052* (2013.01); *H02M 2001/007* (2013.01); *Y02B 40/90* (2013.01); *Y02B 70/126* (2013.01)

(56) References Cited

U.S. PATENT DOCUMENTS

| | | | |
|---|---|---|---|
| 5,250,904 | A | 10/1993 | Salander et al. |
| 5,598,084 | A | 1/1997 | Keith |
| 5,744,962 | A | 4/1998 | Alber et al. |
| 6,417,668 | B1 | 7/2002 | Howard et al. |
| 6,441,584 | B1 | 8/2002 | Crass |
| 6,469,512 | B2 | 10/2002 | Singh et al. |
| 6,992,487 | B1 | 1/2006 | Steinke |
| 7,573,239 | B2 | 8/2009 | Weston et al. |
| 7,635,983 | B2 | 12/2009 | Pecile |
| 7,821,234 | B2 | 10/2010 | Moriya |
| 8,198,860 | B2 | 6/2012 | Law |
| 9,231,491 | B2 * | 1/2016 | Benson ................. H02M 7/003 |
| 2002/0153864 | A1 | 10/2002 | Bertness |
| 2002/0175687 | A1 | 11/2002 | Bertness |
| 2003/0025481 | A1 | 2/2003 | Bertness |
| 2011/0193523 | A1 | 8/2011 | Law |
| 2011/0254582 | A1 | 10/2011 | Partee |
| 2011/0273180 | A1 | 11/2011 | Park et al. |
| 2011/0273181 | A1 | 11/2011 | Park et al. |
| 2013/0062966 | A1 * | 3/2013 | Verghese ................. H02J 7/025 307/104 |

OTHER PUBLICATIONS

Computronic Controls—Sentinel 150/UL150, Automatic Switch Mode Battery Chargers, www.computroniccontrols.com, Birmingham, United Kingdom, Feb. 8, 2012, 4 pp.

Computronic Controls—Sentinel 300P, Programmable Switch Mode Battery Chargers, www.computroniccontrols.com, Birmingham, United Kingdom, Oct. 16, 2014, 4 pp.

Computronic Controls—Sentinel 150P, Automatic Switch Mode Battery Chargers, www.computroniccontrols.com, Birmingham, United Kingdom, Jul. 11, 2014, 4 pp.

DSEPower—DSE9470, DSE9472, DSE9480 & DSE9481—MKII Intelligent Battery Chargers, www.deepseausa.com, Deep Sea Electronics Inc., Rockford, Illinois, 2 pp.

DSEPower—DSE9474—Intelligent Battery Charger, www.deepseausa.com, Deep Sea Electronics Inc., Rockford, Illinois, 2 pp.

LaMarche Stationary Battery Informer, www.lamarchemfg.com, La Marche Mfg., Des Plaines, Illinois, 2 pp.

* cited by examiner

SELF-CONTAINED AUTOMATIC BATTERY CHARGING SYSTEMS AND METHODS

CROSS-REFERENCE TO RELATED APPLICATION

This application claims the benefit of U.S. Provisional Patent Application Ser. No. 61/901,104 entitled "Self-Contained Automatic Battery Charging Systems", filed Nov. 7, 2013, which is incorporated herein by reference.

BACKGROUND

Generally, a battery charger is an electronic assembly comprising electrical, mechanical, and/or electronic components that together perform multiple functions associated with delivering electrical energy to a battery.

Battery charging is carried out in existing devices in several different ways, including linear dissipative voltage regulators, various types of thyristor regulators, and various types of switchmode regulators. Many existing (commercial) battery chargers are transformer type thyristor-controlled battery chargers that are larger and heavier than switchmode type battery chargers. Existing battery chargers including switchmode type battery chargers usually have a poor power factor (i.e. ratio of real power flowing to the load, to apparent power in the circuit), and therefore draw more input current than is necessary, and have non-sinusoidal AC input current.

Existing battery chargers may provide: reverse polarity protection; jumper selectable output voltage (e.g. twelve-volt or twenty-four volt charging); automatic charge cycles; temperature compensation; electromagnetic interference (EMI) filtering; surge protection (protection from unwanted transient electrical energy coming from the AC power source attached to the battery charger); alarm relays; fuses for overcurrent protection on the AC input and the DC output; power factor correction; configuration of the charger via a digital interface; battery charging algorithms; electromagnetic emission control and immunity; alarm systems with low power consumption latching relays; and/or, LCD battery charger status display. However, many existing battery chargers have no reverse polarity protection, no thermal protection, no alarm relays, no text display, no digital communications interface, no microprocessor, no capability to select twelve volt and twenty-four volt operation in the same charger, no capability to charge a zero Volt battery, etc.

Some existing battery chargers use mechanical adjustment devices such as potentiometers, DIP switches, pushbuttons, slide switches or other adjustment mechanisms that have a high risk of failure, intermittent functionality, or wear.

Some existing devices' "housekeeping power supplies," which power on-board control circuitry, are only supplied from AC line power and therefore cannot function if a battery is not connected. Some existing battery chargers may mistake a "zero volt battery" (a battery which has never been charged or which has been deeply discharged and therefore has very low voltage across its battery terminals) for a short circuit and therefore will not initiate battery charging, and/or may be unable to operate due to lack of housekeeping power from the zero volt battery.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter In an embodiment, there is provided a self-contained automatic battery charging system comprising a printed circuit power board that includes input connections to allow AC power to flow into the system. A first high frequency switchmode converter converts the AC input power into DC power, while providing active power factor correction, the converter includes a high frequency isolation transformer to provide electrical isolation between primary circuitry of the system and secondary circuitry of the system. A second high frequency switchmode converter converts isolated DC output from the first converter to a regulated output voltage of the system and limits output current. Output connections for DC output wiring are used to connect to a battery that is to be charged or an optional (parallel) DC load to be powered.

Some embodiments employ an optional printed circuit accessory board electrically connected to the power board and housed in the same chassis or enclosure as the power board. The accessory board further comprises an LCD (Liquid Crystal Display), one or more alarm output relays, and a CANbus interface. Other embodiments are also disclosed. The accessory board may further comprise LED (Light Emitting Diode) status indicators that duplicate a function of LEDs located on the power board and/or the accessory board further comprises LED status indicators that deliver functions in addition to those provided by LEDs located on the power board.

Some embodiments include an alarm summary output such as by internally connecting two or more individual alarm outputs; the alarm summary output provided by an internal connection does not require a separate summary relay or external user wiring and logic; further comprises combinations of latching and non-latching relays to achieve proper behavior in all conditions including no-power conditions and to minimize power consumption; employs heat sink clips having an anti-rotation feature; employs a single heat sink clip design suitable for use with a variety of component package sizes; includes definitions for system-specific functions permitting a user of the system to implement an NFPA-110-compliant interface using information obtained via SAE J1939 compliant data interface; implementation of the NFPA-110-compliant interface using information obtained via SAE J1939 compliant data interface is carried out without additional hardware and wiring associated with dedicated meters and alarm relays required in prior implementations; detection of over current for a long period of time results in the system performing a restart, if that fails the system will lock itself out in a fault mode to disable the system in the event of a shorted battery cell; and/or the system draws operating housekeeping supply from both a connected battery and from AC input power.

In accordance with various embodiments, the system will charge the battery at low current until the battery reaches a threshold voltage, at which point the current will be increased to the maximum allowed current; at a regular interval the system will deliver more current; and the system shuts down and locks off after a pre-determined time interval of operation (such as five minutes) if DC voltage does not exceed a pre-determined safe value. Also, in various embodiments, the charger includes an ultracapacitor charging mode that differs from more common battery charging modes.

In various example embodiments, such as when configured for twenty-four volt output, the system may shut down and lock off after a pre-determined time interval of operation (such as five minutes) if DC voltage does not exceed a pre-determined maximum value (such as for a twenty-four volt battery); and/or, such as when configured for twelve-volt output, if the system detects a DC voltage higher than a pre-determined maximum value the system shuts down and locks off.

Other embodiments, and other variations on the above embodiments, are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

In various embodiments, the present self-contained automatic battery charging system performs many functions in addition to the primary function, which is charging an electrical storage battery, or other electrical storage device. There are multiple embodiments of the present self-contained automatic battery charging systems to provide different sets of optional features and functions, based on users' requirements. As discussed in greater detail below, a self-contained automatic battery charging system comprises one or more electronic printed circuit board assemblies, and associated interconnections and components, mounted with fasteners into a metal chassis or enclosure.

The present self-contained automatic battery charging systems are constructed using a printed circuit board called the "power board" and an optional printed circuit board assembly called the "accessory board". The essential function of the present self-contained automatic battery charging system is to recharge a storage battery, or other storage device, and then maintain it at a state of charge that is optimized for both peak performance and battery/device lifetime. The battery charger functions as an Alternating Current (AC) to Direct Current (DC) converter, with AC electric power flowing into the battery charger's input circuitry, and DC electric power flowing out of the battery charger's output circuitry. The storage battery may be of the lead acid or nickel cadmium types or of other types or chemistries, may be supplemented with or replaced by an energy storage capacitor, and may consist of one of more cells connected in series or parallel.

In addition to charging a battery, the self-contained automatic battery charging system has many features and may perform many functions including, for example automatic charge initiation and termination, and LED indicators may provide AC status and DC status. As a further example, embodiments may provide active power factor correction, resulting in sinusoidal AC input current in phase with the AC input voltage waveform, which is desirable because it minimizes harmonics on the AC line and minimizes the input volt-amps required to provide adequate input power to operate the device. Also, filtering of outgoing electromagnetic interference (EMI) that can interfere with the operation of other electrical and electronic devices and of incoming EMI that can interfere with charger's performance may be provided. Example embodiments may provide user-configurable DC output voltage selection for, by way of example, a twelve-volt battery or a twenty-four volt battery, and boost modes, by means of either manual jumpers or computer data port. Automatic protection may also be provided against the wrong voltage battery being connected to the device, such as either a twelve-volt battery when configured for twenty-four volt operation, or a twenty-four volt battery when configured for twelve-volt operation. Further, embodiments of the present system may automatically sense and charge a battery, energy storage capacitor or combination thereof from any discharge condition including zero voltage. In accordance with various embodiments, short circuit protection on the output, reverse polarity protection, which may prevent damage to the device when a battery is connected backwards, thermal protection, which may prevent damage when the device is operated in an environment hotter than the charger's rated operating temperature and battery temperature compensation, which incrementally increases output voltage at lower ambient temperatures, and incrementally decreases output voltage at higher ambient temperatures, to adequately charge but not overcharge the battery, may be provided. An optional LCD display and optional relays for alarm outputs may be provided in various embodiments. An optional J1939 compliant CANbus interface, or the like may be provided in accordance with various embodiments to enable two-way communication with the charger.

Hence, embodiments of the self-contained automatic battery charging systems and methods combine active power factor correction, high efficiency and advanced thermal and electrical protection features in a single self-contained device. Various self-contained automatic battery charging system embodiments use different input and output connectors on the same Printed Circuit Board (PCB) utilizing multiple sets of mounting holes. Charger system embodiments can be programmed either manually in discrete increments or programmed in nearly infinite increments via a digital interface. The self-contained automatic battery charging systems may be open-frame or housing-enclosed. Certain embodiments may include an accessory board with LCD display, alarm relays and CANbus interface.

Various embodiments of a self-contained automatic battery charging system include an electronic printed circuit board assembly called a power board. AC input circuitry is the first power processing stage, which is a Power Factor Corrected (PFC) converter employing a high-frequency isolation transformer. The output of the converter is applied to a second high frequency switchmode converter, which properly regulates and filters output voltage and limits the output current for application to the battery and optional parallel-connected DC load. A microprocessor-controlled semiconductor switch is placed in the output circuit for reverse polarity protection.

Figure 1:
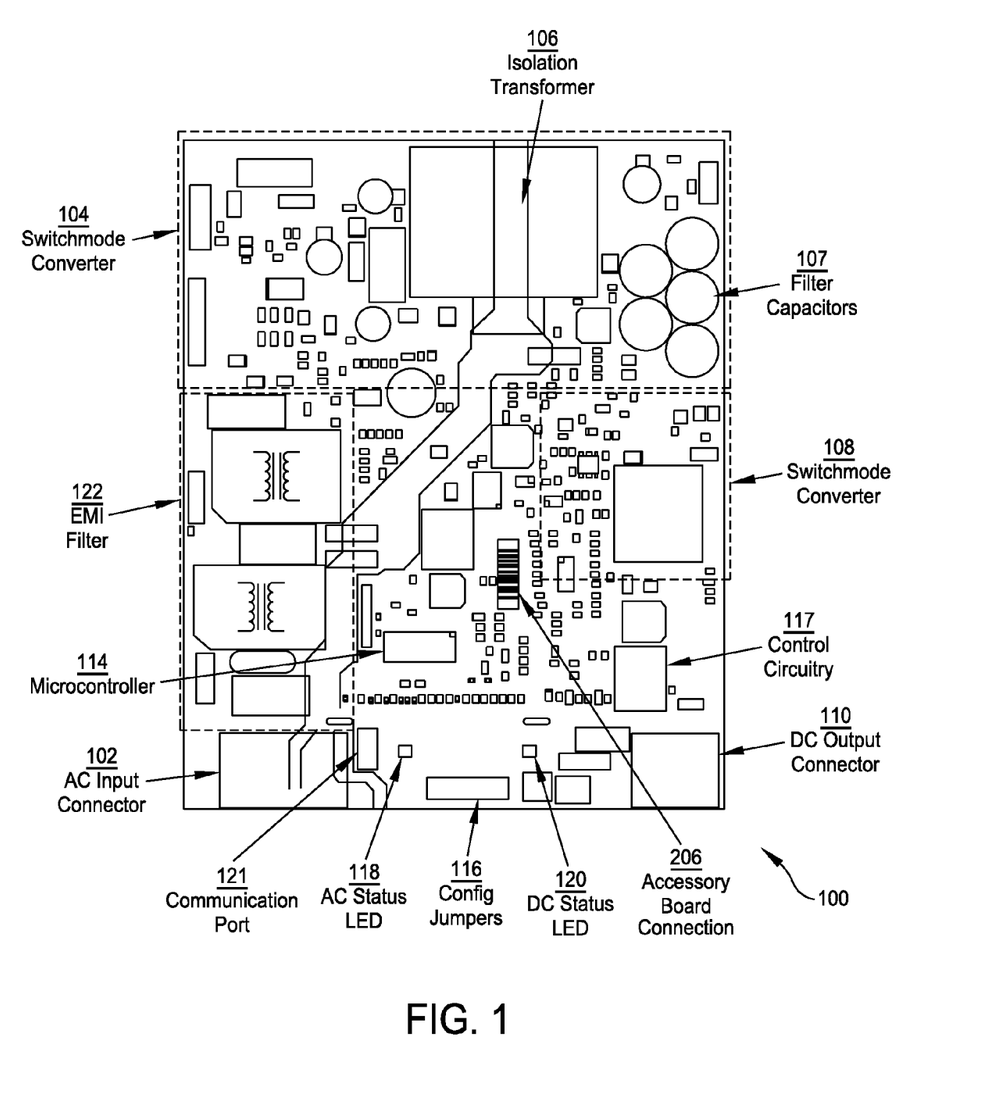
FIG. 1 illustrates a self-contained automatic battery charging system power board layout, according to one embodiment.
Figure 2:
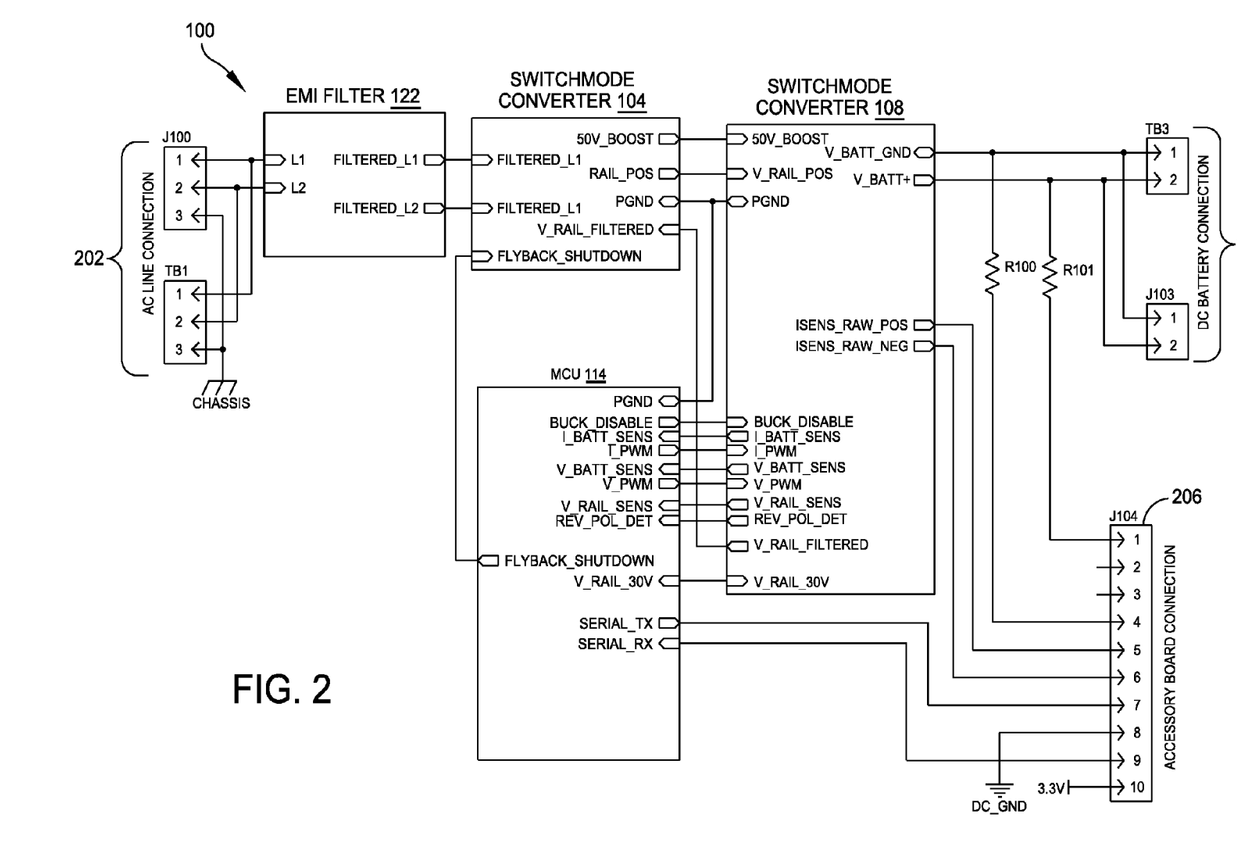
FIG. 2 illustrates a self-contained automatic battery charging system power board block diagram, according to one embodiment.

The power board has many components, each with a specific purpose in enabling operation of the battery charger. FIG. 1 illustrates a layout of self-contained automatic battery charging system power board 100, according to one embodiment, and FIG. 2 is block diagram of self-contained automatic battery charging system power board 100, according to one embodiment. AC input wiring is used to connect an AC power source to input connections 102 of the battery charger to allow AC power to flow into the device. On power board 100, input connector 102 may have a feature (such as on the printed circuit board itself) to allow any one of two or more different configurations of connectors to be installed into holes in the printed circuit board. First high frequency switchmode converter 104 is used to convert the AC input into DC output. Converter 104 uses high frequency isolation transformer 106 to provide electrical isolation between the primary circuitry (AC to DC conversion circuitry of power board 100) and secondary circuitry (control and other feature circuitry of power board 100 and/or of the accessory board discussed below). First switchmode converter 104 may also include filter capacitors 107, and other electrical components.

DC output from the isolation transformer is connected to an input of second high frequency switchmode converter 108, which is used to regulate the output voltage and limit the output current of the battery charger. Output connections 110 are provided on power board 100 for DC output wiring used to connect the battery or other electrical storage device that is to be charged and/or an optional parallel-connected DC load to be powered. In accordance with various embodiments of the self-contained automatic battery charging systems and methods described herein, precision voltage regulation may be enabled by placement of a sense point right at the output terminals, software compensation for voltage drop due to current, and/or the like.

Various embodiments may employ input current inrush limiting to prevent AC fuses from blowing and or circuit breakers from tripping, and may employ a permanently installed DC fuse, which will only open in case of component failure on power board 100.

Various embodiments of the present self-contained automatic battery charging systems and methods may employ active power factor correction. The input AC voltage waveform is sinusoidal. Active circuitry in first high frequency switchmode converter 104 is used in such embodiments to control the amount of electric current flowing into the battery charger's input circuitry such that it is also sinusoidal, and in-phase with the input voltage waveform.

The present multi-stage design (such as the illustrated embodiment two-stage, first to second high frequency switchmode converter design) permits use of effective combinations, and optimization of, characteristics that cannot be accomplished in a single-stage design, such as power factor correction, plus low-ripple, etc. Embodiments of the present systems and methods may: employ single or multi-phase AC input; the electrical power source may be AC, DC or dual AC/DC; and, output may be provided to one or more batteries, different electrical storage devices, and/or one or more non-battery loads.

In various embodiments of the self-contained automatic battery charging systems and methods, various system protections may be built-in on power board 100, such as protection against DC short circuit, reverse DC polarity, and over current. A shorted battery cell can keep charge current at maximum. The resulting chronic overcharge can cause all battery cells to generate significant gas, creating a safety hazard. Hence, if an over current is detected for a long period of time, the system may perform a restart, such as by pausing for a pre-determined time interval, such as, by way of example, five seconds. If that fails, system embodiments may lock-out in a fault mode. This feature has the potential to appropriately disable the charger in case of a shorted battery cell. Such embodiment protections might include reverse polarity protection, provided for power supply and for output voltage sense signals.

Further protections that may be built-in on power board 100 in various embodiments of the self-contained automatic battery charging systems and methods may include load dump (disconnection of battery) protection, wherein the system may become a voltage source and regulate its output to a set float or boost voltage. With respect to overvoltage, embodiments can, by way of example, withstand up to forty-volt input on DC connections 110. System embodiments may shut down if overvoltage is detected. This may vary with DC output selection. Overvoltage protection may have three features: shutdown is selective, meaning shutdown only occurs if overvoltage is self-induced; the shutdown values differs whether the charger is in twelve-volt versus twenty-four volt mode; and the shutdown value may be set by the charger itself, if the charger sets its output voltage mode automatically.

Thus, in accordance with various embodiments of the present self-contained automatic battery charging systems and methods, the system is digitally controlled with various adjustable set points. The present self-contained battery charging system eliminates all mechanical switches and potentiometers, because these are more prone to failure than the electronic components such as control circuitry 117, microprocessor 114 and jumpers 116 employed in the present self-contained battery charging system embodiments.

Embodiment protections built into power board 100 with respect to thermal self-protection may include system protection from overheating and reducing output power to allow internal parts to stay within a safe operating range. With respect to loss of AC power, when AC power loss is detected in various embodiments the system power board may lockout for a minimum of, by way of example, five seconds before returning to idle, then it may restart automatic boost charge or go into float charge mode.

Embodiments of the self-contained automatic battery charging systems and methods may make use of combinations of latching and non-latching relays to achieve proper behavior in all conditions, including no-power conditions and to minimize power consumption. Components may be highly integrated (such as on a single Printed Circuit Assembly (PCA) and/or within a single enclosure) or distributed (such as on multiple PCAs, and/or in multiple enclosures, separated by distance), each providing advantages for specific applications.

Figure 3:
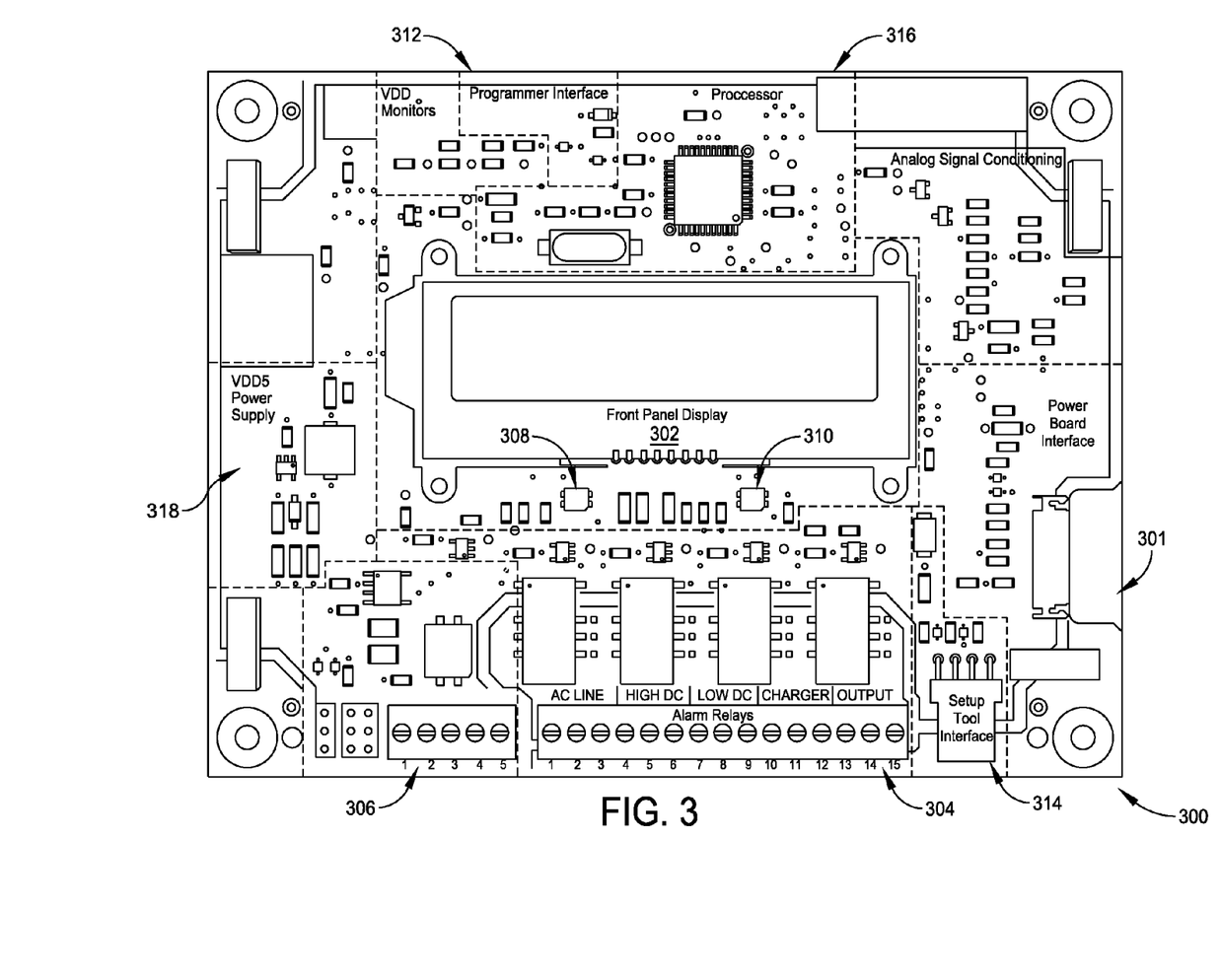
FIG. 3 illustrates a self-contained automatic battery charging system accessory board layout, according to one embodiment.
Figure 4:
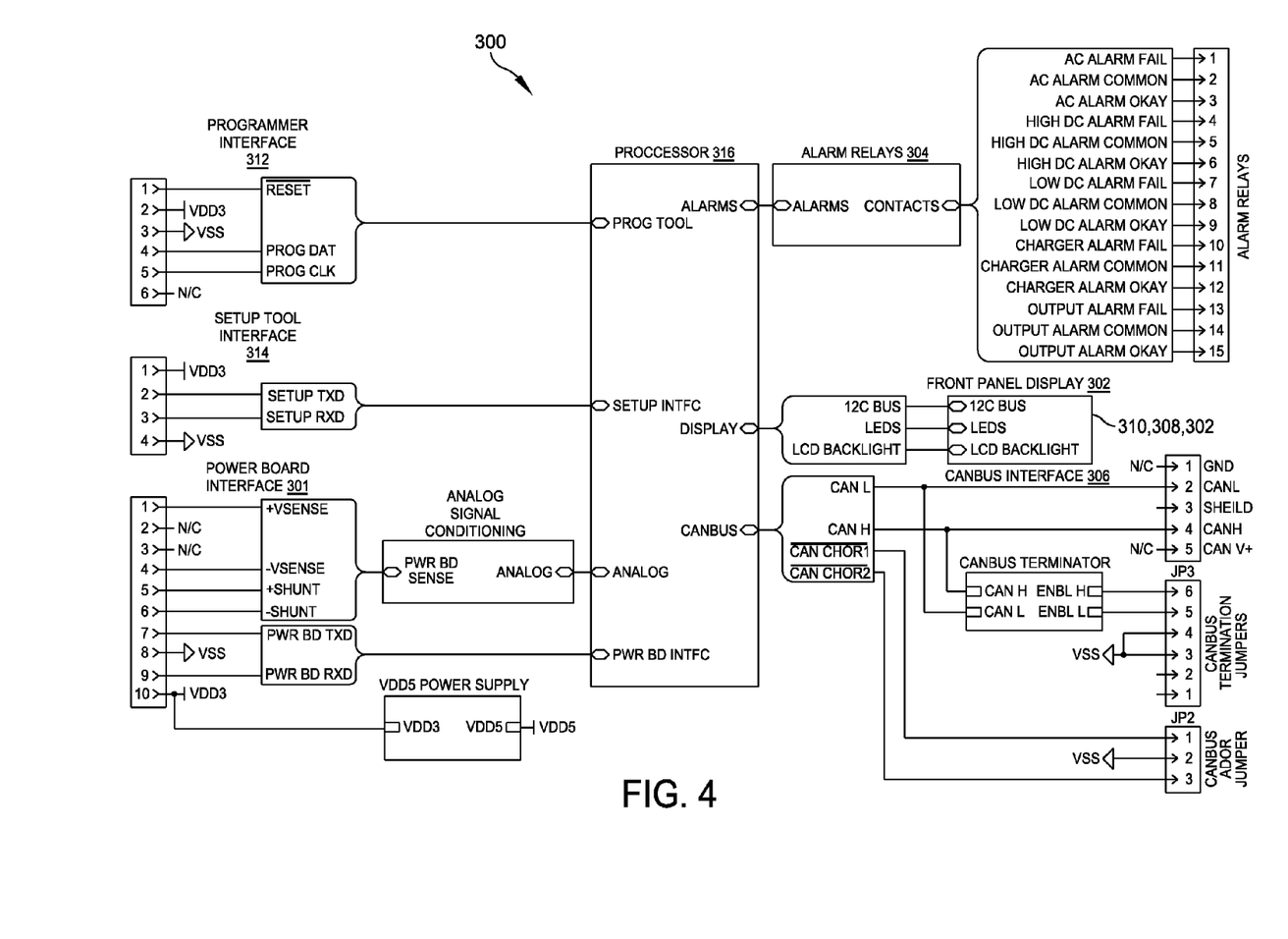
FIG. 4 illustrates a self-contained automatic battery charging system accessory board block diagram, according to one embodiment.

Hence, various embodiments of a self-contained automatic battery charging system may also contain another electronic printed circuit board assembly referred to herein as an accessory board, which is electrically connected to power board 100, via accessory board connector 117 and is housed in a same chassis or enclosure, along with the power board, as discussed in greater detail below. FIG. 3 illustrates layout of self-contained automatic battery charging system accessory board 300, according to one embodiment, and FIG. 4 is a block diagram of self-contained automatic battery charging system accessory board 300, according to one embodiment. Accessory board 300 may be electrically connected to power board 100 via power board connector and associated interface 301. Additional features and functions in a self-contained automatic battery charging system that contains accessory board 300 might, in accordance with various embodiments, include LCD display 302, one or more alarm output relays 304, and/or a CANbus interface 306. The accessory board also may also have LED status indicators 308 and 310 that can be used to either duplicate the function of LEDs 118 and 120 located on power board 100 or deliver different functions.

In the event of low battery voltage and/or short circuit the system embodiments will charge the battery at a low current (for example 0.75 A to 1 A) until the battery reaches a threshold voltage (for example 5 VDC), at which point the current will be increased to the maximum allowed current. At a regular interval (for example every 15 seconds) the charger may deliver more current, so that a resistive load or other load would show an increased voltage. As a safety measure, the charger may shut down and lock off after five minutes of operation (or a different pre-determined time interval) if DC voltage does not exceed a pre-determined safe value. When this happens LCD-equipped chargers display "Low battery voltage," "Charger fail" and/or the like on an alarm display screen. This shutdown prevents long-term overcharge of the battery in case of mismatched battery voltage and charger voltage settings. A charger that is locked out due to battery mismatch can, in accordance with various embodiments of the present systems and methods, be reset manually.

In accordance with various embodiments, the present self-contained automatic battery charging systems and methods may detect a mismatch when the charger is set for a twenty-four volt battery and is connected to a twelve-volt battery. In such a case, the charger may shut down and lock off after a pre-determined time interval of operation (such as five minutes) if DC voltage does not exceed a pre-determined value within the normal operating range for a twenty-four volt battery. When this happens LCD-equipped chargers may display "Low battery voltage," "Charger fail," and/or the like on the alarm display screen. This shutdown prevents long-term overcharge of, for example, a twelve-volt battery in case of mismatched battery and charger settings. Again, a charger that is locked out due to battery mismatch may be reset manually. This may be done by removing and replacing any one of a number of charger adjustment jumpers 116 on power board 100.

In accordance with various embodiments, the present self-contained automatic battery charging systems and methods may detect a mismatch when a charger set for a twelve-volt battery is connected to a twenty-four volt battery. When a charger set for twelve-volt output detects a battery higher than a predetermined voltage, such as by way of example eighteen volts, the charger shuts down and locks off. When this happens LCD-equipped chargers will display "High battery voltage," "Charger fail," or the like on the alarm display screen. The charger may be restarted manually, such as by removing and replacing any one of the charger adjustment jumpers.

Calibration of the present systems may be carried out using hardware and/or software. Software-only calibration may have certain advantages. Software calibration may allow for automation during production, eliminate reliability issues of potentiometers, and/or the like. In accordance with various embodiments software parameters may be arranged in non-volatile memory, including both protected (e.g. serial number, calibration) and non-protected (e.g. output voltage) values. Embodiments of the self-contained automatic battery charging systems may be dual-configurable, i.e. software, jumper or combination configurable. Software messages for LCD display 302 may be configurable for multiple languages. LED messages may be coded using color, on/off duration, pulse control (including pulse count), intensity or combinations thereof to provide a compact, low-cost, high-reliability user interface, in accordance with various embodiments. Redundant LEDs can be disabled to conserve power.

Embodiments of the self-contained automatic battery charging systems and methods include an ability to communicate for setup and configuration, which may be over power board communication port 121 or a separate accessory board communication port 314. In some embodiments such communication may use proprietary implementations, so as to prevent unintended access to critical parameters. The communication port(s) may use any interface method (wired, wireless radio, infrared/optical, inductive) and any format/protocol. Some embodiments may specifically use a wired serial port with proprietary binary protocol for low-cost/simplicity.

A setup/configuration program may be provided to communicate with the charger, and it may be considered part of various embodiments of the overall system. The program might be run on any suitable device such as a smart phone, a general-purpose computer, or a special-purpose computing device. The program allows a user to set parameters, one at a time, in groups or in a single all-inclusive set. The user may save configuration parameters in a file for later re-use or editing. This permits easy mass commissioning of chargers with identical parameters. The program allows a user to field-upgrade charger firmware. Capability may be provided in various embodiments to load pre-defined battery-specific files containing data on battery attributes and other parameters. In accordance with various embodiments incremental improvements or adjustments to the performance of the present self-contained automatic battery charging systems may be made by revising the firmware, without making any changes to the hardware. Such changes in the behavior or performance of the battery charger may be associated with efficiency and protection functions.

Also, in accordance with various embodiments of the present systems and methods, charging mode selection may allow selection of either battery charging mode or ultracapacitor and/or supercapacitor charging mode. Thereby, a capability may be provided in various embodiments to load pre-defined ultracapacitor and/or supercapacitor specific files containing data on specific ultracapacitor and/or supercapacitor model attributes and other parameters. In ultracapacitor and/or supercapacitor mode, different control rules and protective systems and methods may enable the charger to operate safely for long periods at voltages well below the nominal voltage of the storage device being charged In various embodiments, a software communication library that is application-independent underlies setup/configuration communications. In some implementations this is a dynamically linked library (e.g. .dll or other data item) for easy application integration and updates. Such a standardized communication library can be used in conjunction with more than one model of charger and with more than one software application. Such a common code base reduces development and maintenance effort.

Embodiments of the device may implement SAE J1939, such as on accessory board 300, or elsewhere. CANbus is an electrical specification for an interface and J1939 is a specific implementation of a communication protocol. Embodiments optionally implement not only those functions required by SAE J1939, but also charger-specific functions permitted by, but not defined in, J1939. Embodiment definitions for charger-specific functions which, among other things, permit a user of the charger to implement NFPA-110-compliant interface 306 using information obtained via J1939 without the additional hardware cost and wiring associated with dedicated meters and alarm relays in prior implementations.

Various embodiments of the self-contained automatic battery charging systems and methods may support communication protocols other than SAE J1939, such as Modbus ASCII, Modbus RTU, Modbus TCP/IP, etc. Correspondingly, various embodiments of the self-contained automatic battery charging systems and methods may support interfaces other than CAN, such as RS485, Ethernet 10-base-T, Ethernet 100-base-T, etc.

For temperature sensing, embodiments of the device have the capability to use one or more sensors, and the ability to manage using local or remote sensors, communicating via J1939 CANbus interface 306, or the like.

With respect the accessory board customer connected logic and power signals may be filtered in certain embodiments. Logic signals attached to any connector or configuration header may have an ESD protection device. Embodiment CANbus signals may have a jumper-selected termination network. The terminator may use split resistance with a bypass capacitor to the common reference, providing both differential-mode termination for CAN data and common-mode termination to improve EMI rejection. Unlike existing chargers, the CANbus termination is easily disconnected for installations in the middle of the bus, or where an external terminator already exists, situations that occur often. A CAN Charger Select configuration jumper, in embodiments, selects the J1939 charger function, which may be either BCH1 (charger for "main" battery") or BCH2 (charger for "auxiliary" battery). If no jumper is present the default action may be to disable the CANbus interface, but OEMs (Original Equipment Manufacturers) can select BCH1 or BCH2 as the default (for "jumperless" operation, similar to the power board).

Embodiment accessory board processor 316 may include program ROM, data RAM, data EEPROM, multi-channel analog to digital converter, CANbus controller, dual serial ports (UARTS, used for power board and setup tool interfaces), I$^2$C controller (used for LCD control), several timers, and system clock function. The processor clock may be set by a crystal to meet J1939 tolerance requirements. Processor outputs may use pull-up or pull-down resistors to hold the signals in their inactive state during power-on reset and while the processor initializes the I/O ports. The illustrated embodiment CANbus transceiver may use five-volt power supply 318 to meet the CAN specifications. Power supply 318 may include a boost converter that raises the 3.3V power supply to 5.0V, for use by the CANbus transceiver, alarm relays, and the LCD backlight LEDs. When the CANbus is not used, the transceiver can be disabled to reduce power-off battery drain. The CANbus interface operates at 250 KBaud, the standard J1939 data rate. Alternate CANbus data rates (62.5K, 125K, 500K or 1 MBaud) are within the interface's electrical capability, and can be selected, such as by custom setup using the setup tool, in embodiments where software is capable of maintaining such data rates.

FIGS. 3 and 4 illustrated embodiments may use four alarm relays 304, with each relay providing one form "C" contact set for its alarm condition. In addition to the individual contacts, a second set of contacts on two of the relays may be, as illustrated, wired to provide an "Output" alarm, providing, by way of example, a single alarm contact function that may be used for emergency power supply systems, fire pump charger applications, and the like. These contacts may be in a "FAIL" state when the charger output malfunctions for any reason, and in an "OK" state when the charger is operating normally. To minimize power-off battery drain in various embodiments, three of the relays may be latching relays, so they do not require continuous coil power. One relay may be non-latching so that it switches to FAIL when power is absent; it is also commanded to the FAIL state when AC failure occurs, so that its coil power will not increase power-off battery drain.

FIGS. 3 and 4 illustrated embodiment front panel display, the primary display, is a character-mode LCD (302). This display uses an I$^2$C serial interface, reducing the number of IO (Input/Output) lines dedicated to the display. The display has a hardware-reset signal driven by the processor. There is a pull-down resistor to hold the display in reset until the processor asserts control over the signal. This assures the display remains "clean" during power-on and power-off transitions. Various embodiment displays have a white LED back-light. The backlight may be switched under processor control. Embodiment displays also have two multi-color LEDs, duplicating the function of (an) LED(s) on power board 100 and/or that deliver functions in addition to those provided by LEDs located on power board 100.

FIGS. 3 and 4 illustrated embodiments may employ analog signal conditioning, both analog sense channels from power board 100, SHUNT and VSENSE, have a differential buffer amplifier to scale the ADC sense signal and to reduce the effect of DC offset voltage between accessory board 300 and power board 100. In addition to these two signals from power board 100, to be shown on display 302 and reported via the CANbus, there are voltage dividers for accessory board power supplies, in various embodiments. The ADC readings from these channels are used for self-test of the accessory board. If both readings are within their expected range, the system can confirm that the power supply, reference voltage generator and the processor's ADC are functioning properly.

Embodiments of the present self-contained automatic battery charging systems are capable of charging a "zero volt battery". The term "zero volt battery" refers to a battery which has been deeply discharged and therefore the voltage across the battery terminals is very low, and can be described as being nearly "zero volts". Unless a battery charger is specifically designed to detect and charge a zero volt battery, the battery charger may not function for several reasons, possibly including because the charger derives its control power only from battery voltage, or because the charger mistakes the zero volt battery for a short circuit and does not start as a safety measure. Embodiments of the present self-contained automatic battery charging systems are capable of operating their "housekeeping supply" either from battery power or from AC input power. Existing devices typically are operated only from AC line power and therefore cannot function if the AC line is not connected and/or when connected to a zero volt battery.

Embodiments of the present systems and methods may meet multiple regulatory standards in multiple jurisdictions, UL, C/UL, CE, IBC, NFPA, OSHPD, California efficiency, and/or the like. For California efficiency, embodiments of the present systems and methods may implement adaptive control to comply, are able to track time history of energy consumption to meet time-based requirements, and/or the like. Embodiments of the present self-contained automatic battery charging systems work with ungrounded, negative grounded, positive grounded DC systems.

Figure 5:
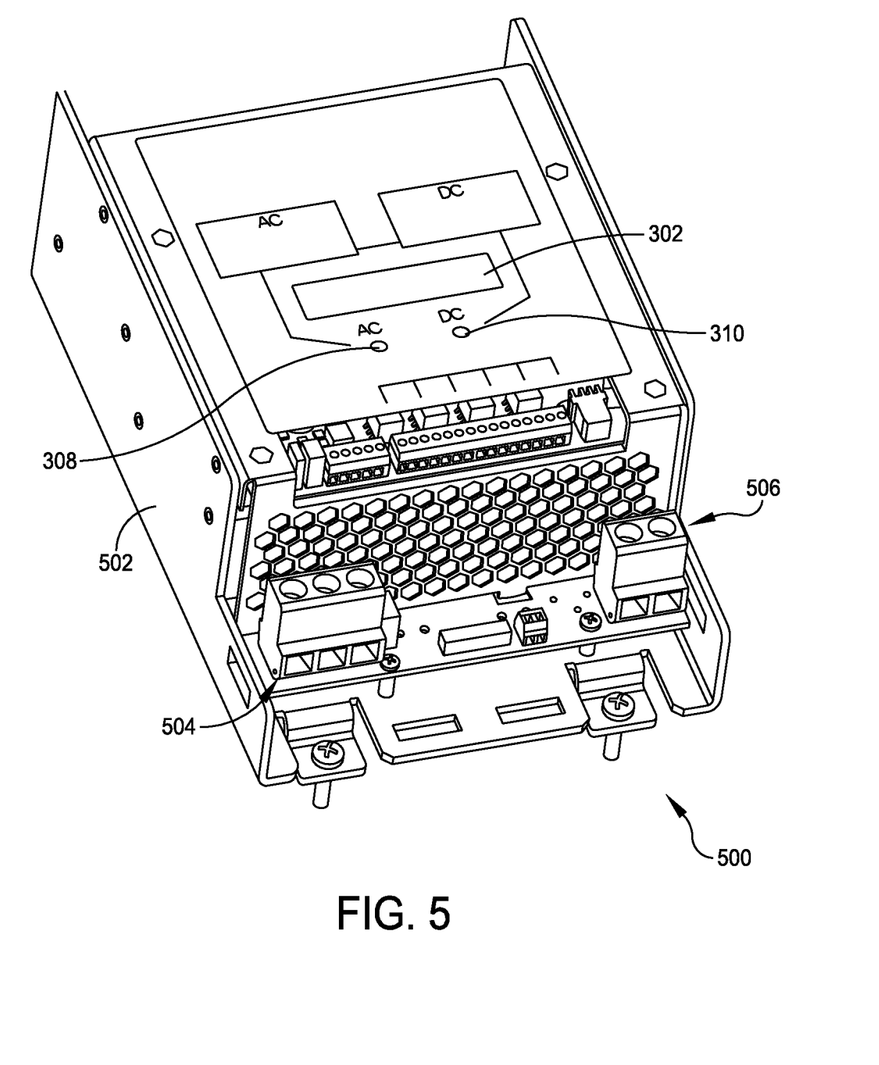
FIG. 5 illustrates a front perspective view of a self-contained automatic battery charging system utilizing a combination chassis and heat sink, according to one embodiment.
Figure 6:
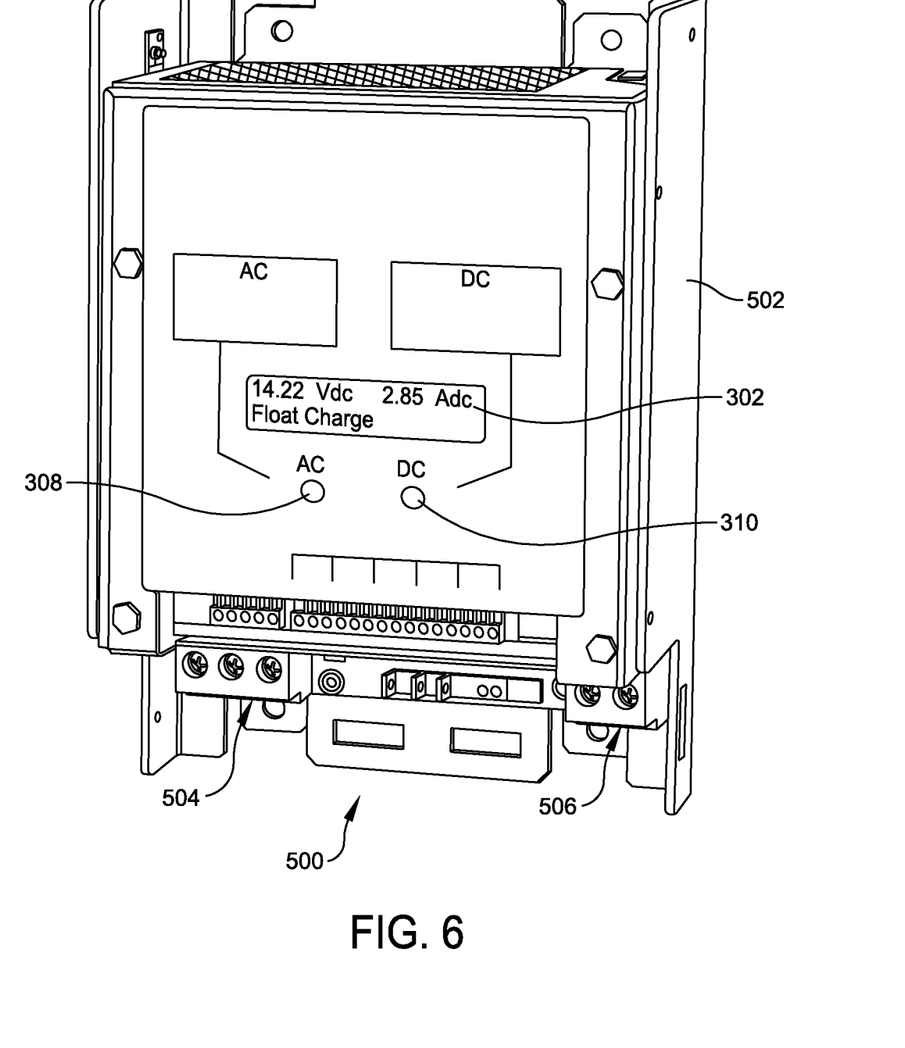
FIG. 6 illustrates another front perspective view of a self-contained automatic battery charging system utilizing a combination chassis and heat sink, according to one embodiment.

FIGS. 5 and 6 illustrate front perspective views of self-contained automatic battery charging system 500 utilizing a combination chassis and heat sink 502, according to some embodiments. Embodiments of the present self-contained automatic battery charging systems utilize combination chassis and heat sink design such that aluminum chassis 502 may provide both structural mounting for end user electrical connections 504 and 506, an end user and agency compliant safety enclosure, and the surface area needed for thermal dissipation through natural convection cooling. Thermal output from electrical components is dissipated through conduction directly into the chassis walls 502, while the components are kept electrically isolated using a high dielectric and low thermal resistance film interface. In accordance with various embodiments, the combination chassis/heat sink eliminates need to cool the power components individually with forced air fan cooling, or the like.

As noted, embodiments of a self-contained battery charging system may or may not include an accessory board, and may or may not include an enclosure for outdoor use. Thus one "minimum" embodiment of the present self-contained automatic battery charging system comprises only a power board, mounted in a chassis (for indoor, or otherwise protected, use).

Figure 7:
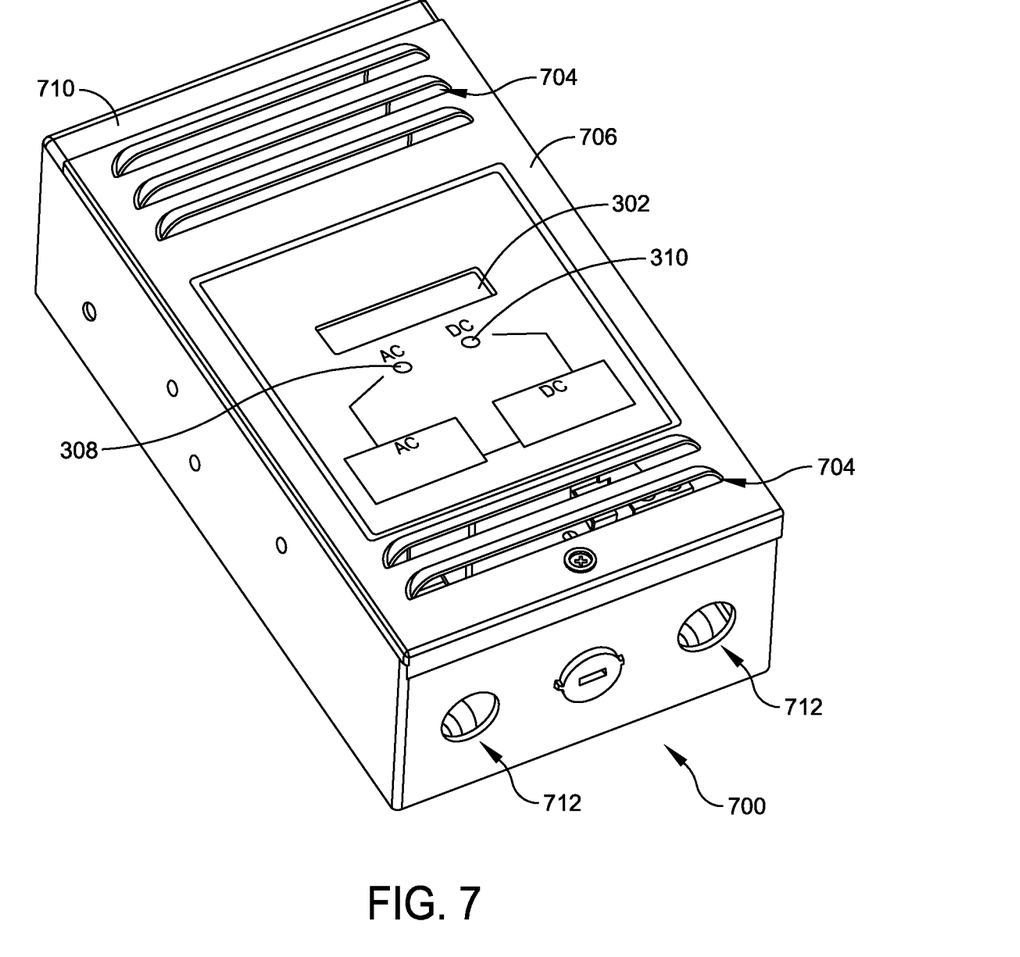
FIG. 7 illustrates a front perspective view of a self-contained automatic battery charging system having a weatherproof enclosure, according to one embodiment.
Figure 8:
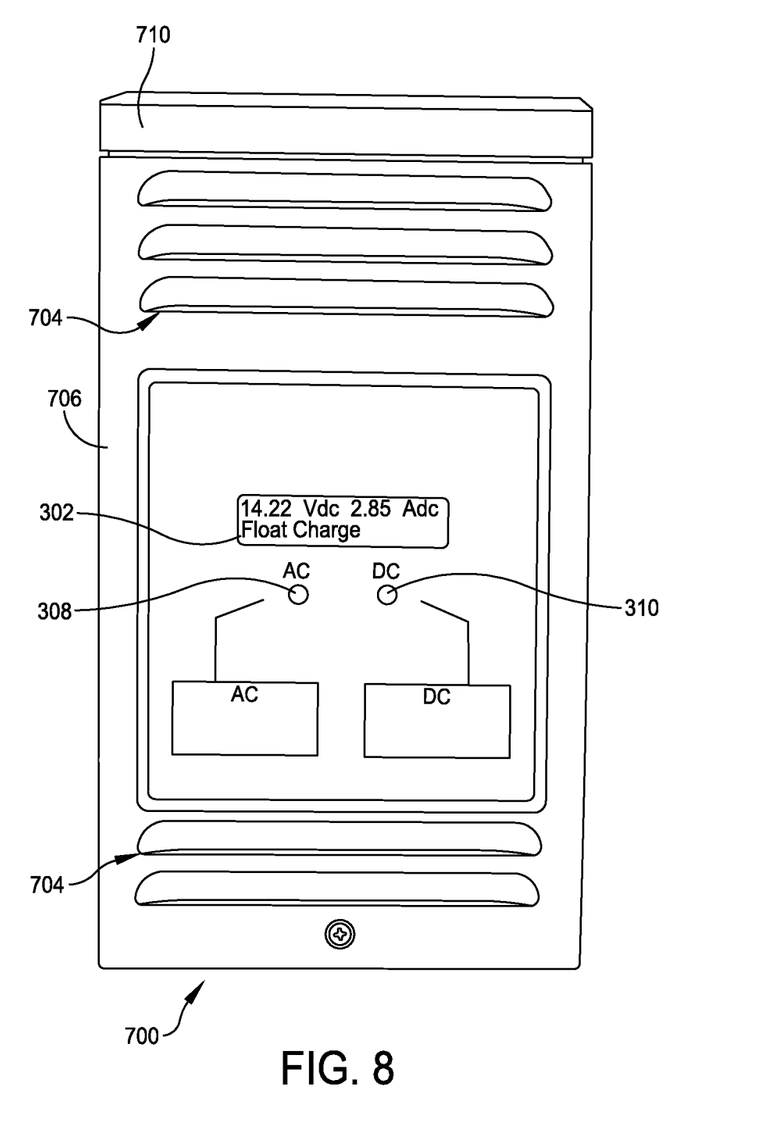
FIG. 8 is a front view of a self-contained automatic battery charging system having a weatherproof enclosure, according to one embodiment.

However, some embodiments may have a weather-resistant enclosure. FIGS. 7 and 8 illustrates front views of self-contained automatic battery charging system 700 having weather-resistant enclosure, according to some embodiments. In various embodiments enclosure is vented (704), yet provides for a high degree of protection from water ingress by virtue of the location and orientation of vents 704 and use of a rear mounting surface to prevent direct ingress of water or particles. Thus, enclosure provides a high degree of protection from water ingress without the use of gaskets or seals on removable cover 706. This is accomplished by the profile shape of the cover as it mates with base enclosure and overhang 710 of the top of the enclosure. The enclosure provides a minimum footprint by virtue of the location of bottom-entry wiring openings 712 and inboard location of mounting holes.

A local Remote Temperature Sensing (RTS) sensor may be located, such as by way of example, at incoming air vent 704 to minimize effects of self-heating, in accordance with various embodiments of the present self-contained automatic battery charging systems and methods. Remote temperature compensation may be provided by the remote sensor, through connection to a temperature compensation port on power board 100 and/or accessory board 300. Automatic protection of the temperature compensation system from going to out-of-range values due to shorted or open sensor may also be a feature of various embodiments. Additionally, embodiments of the self-contained automatic battery charging systems may have fault-tolerant (for shorts or opens) remote temperature sensor input. An alarm summary output may be provided by an internal connection scheme that eliminates the need for a separate summary relay or external user wiring and logic.

Figure 9:
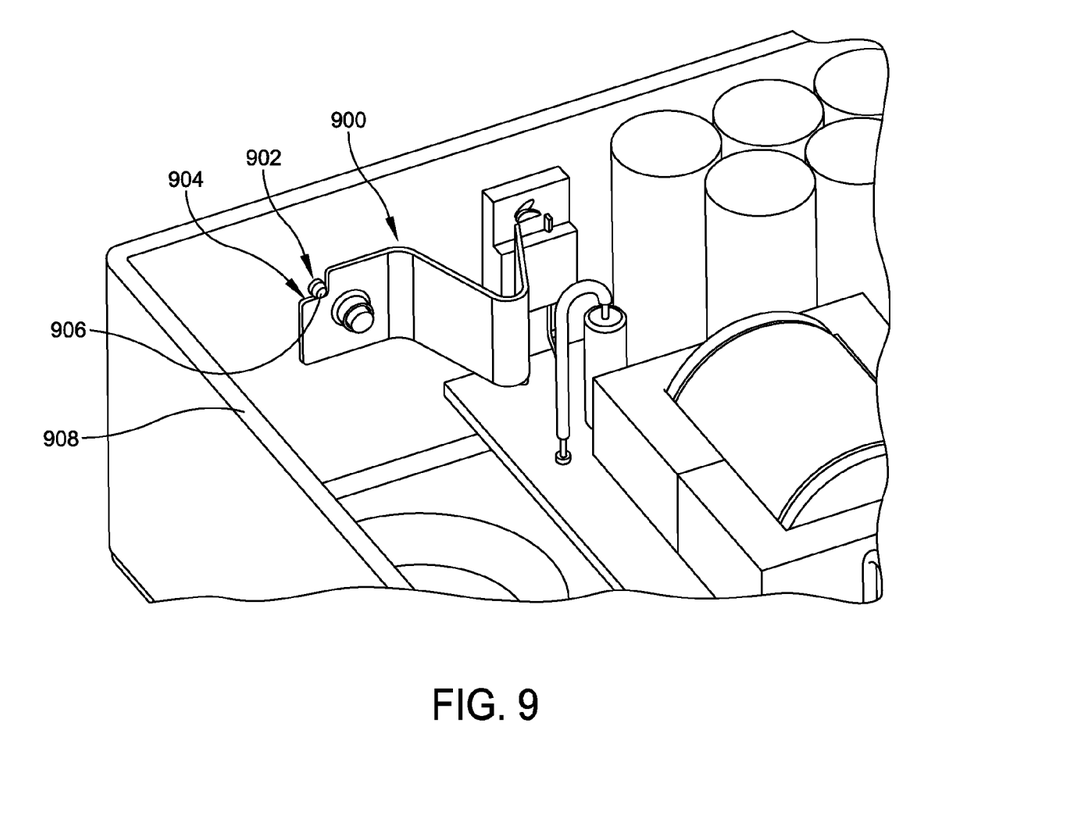
FIG. 9 illustrates a fragmented view of a portion of a self-contained automatic battery charging system showing a single heat sink clip suitable for use with a variety of component package sizes and having an anti-rotation feature, according to one embodiment.
Figure 10:
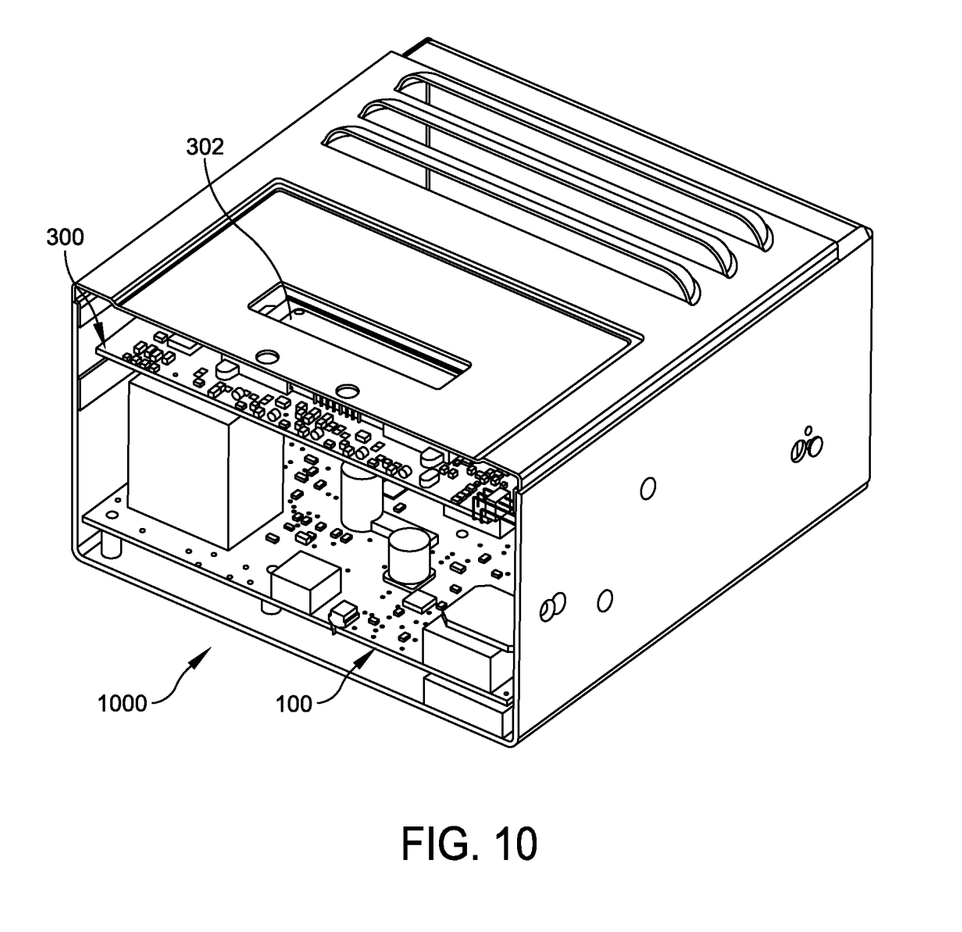
FIG. 10 is a generally cross-sectional, fragmented view of a self-contained automatic battery charging system, according to one embodiment.

FIG. 9 illustrates an embodiment of heat sink clip 900, which includes anti-rotation element 902 to speed assembly and reduce production costs. Clip 900 is designed so that a single clip design can clamp a variety of electronic packages, thus eliminating the need for multiple clip types and reducing production costs. In accordance with various embodiments of the present systems and methods, anti-rotation element 902 comprises cut-out corner 904, and peg 906, or the like, pressed into chassis 908. Clips 900 may facilitate mounting of main power board 100 as shown in FIG. 10, which is a generally cross-sectional, fragmented view of self-contained automatic battery charging system 1000, according to one embodiment.

Regardless of whether an employed embodiment of the present charger is chassis-mounted our mounted in an enclosure, during installation, a self-contained battery charging system may be mounted on a flat vertical surface such as a wall, or a panel, bracket or the like on machinery, such as a generator set. The charger may be mounted using fasteners such as screws or bolts. With electric power turned off, AC input wiring is attached to the AC input terminal block or connector. Without a battery connected, DC output wiring is attached to the DC output terminal block. The user selects and places the configuration jumpers in the correct jumper positions. A battery of the correct type, voltage, and polarity is connected. AC power is turned on and the user verifies correct operation of the battery charger. If the optional accessory board is present, the user may also connect a CANbus interface cable and individual wires to the alarm relay outputs as required for the application.

In accordance with various embodiments many different components or substitute parts can be used in the present self-contained automatic battery charging systems. Transformers from different manufacturers, Field Effect Transistors (FETs), capacitors, resistors, integrated circuits, diodes, inductors, and other discrete board-mounted electronic components may be "second sourced" or substituted. Embodiments of the present self-contained automatic battery charging systems may contain many critical components, for electrical performance, mechanical performance, thermal management, and proper operation of the firmware and digital interfaces. Typical materials used in commercial electronic products are used in the self-contained battery charging system; include copper, aluminum, steel, plastics, dielectric materials, semiconductor materials, etc.

Embodiments of the present self-contained battery charging system could be used as a power supply, such as with no battery connected. In such embodiments, functions such as precision voltage regulation, alarm circuitry, reverse polarity protection and other protective systems might not necessarily be needed, but they would not interfere with normal operation of the unit if employed as a power supply without a battery.

If the accessory board is not included the resulting self-contained automatic battery charging system embodiments are capable of charging a battery, however, some features may not be present such as alarm relay outputs, LCD display, and the like. Hence, in accordance with various embodiments certain functions of a self-contained automatic battery charging system may be eliminated such as active power factor correction, zero volt battery charging, temperature compensation, reverse polarity protection, thermal protection, and/or surge protection, separate from and without taking away from other remaining features. Further alternative embodiments might always operate only at twelve-volt or only at twenty-four volt and not be user selectable between twelve-volt or twenty-four volt operation.

Thus, although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A self-contained automatic battery charging system comprising:
   a power printed circuit board (PCB) comprising:
      input connections to allow an alternating current (AC) power to flow into the self-contained automatic battery charging system;
      a first switchmode converter configured to convert the AC power into a direct current (DC) power and the first switchmode converter configured to provide active power factor correction so as to provide an improved power factor, the first switchmode converter comprising a high frequency isolation transformer to provide an electrical isolation between a primary circuitry and a secondary circuitry of the self-contained automatic battery charging system;
      a second switchmode converter connected to a DC output from the first switchmode converter and that is configured to regulate an output voltage and limit an output current of the self-contained automatic battery charging system; and
      output connections configured for wiring the DC output to an electrical load.

2. The self-contained automatic battery charging system of claim 1, wherein the electrical load is a battery to be charges, another electrical storage device to be charges and/or a DC load to be powered.

3. The self-contained automatic battery charging system of claim 1, wherein the first switchmode converter comprises an active circuitry for controlling an amount of electric current flowing into the first switchmode converter to maintain a sinusoidal waveform in phase with an input voltage waveform to provide the active power factor correction.

4. The self-contained automatic battery charging system of claim 1, further comprising an accessory PCB electrically connected to the power board and they are housed in a same chassis and/or enclosure PCB, the accessory PCB further comprising an LCD display, one or more alarm output relays, and/or a controller area network bus (CANbus) interface.

5. The self-contained automatic battery charging system of claim 4, wherein the accessory PCB further comprises LED status indicators that duplicate a function of LEDs located on the power PCB.

6. The self-contained automatic battery charging system of claim 4, wherein the accessory PCB further comprises LED status indicators that deliver a function different from LEDs located on the power PCB.

7. The self-contained automatic battery charging system of claim 1, further comprising an alarm summary output provided by an internal connection.

8. The self-contained automatic battery charging system of claim 7, wherein the alarm summary output provided by an internal connection does not employ a separate summary relay or external user wiring and logic.

9. The self-contained automatic battery charging system of claim 1, further comprising combinations of latching relays and non-latching relays to provide zero voltage battery charging and/or to minimize power consumption.

10. The self-contained automatic battery charging system of claim 1, further comprising heat sink clips having anti-rotation element bearing on the power PCB.

11. The self-contained automatic battery charging system of claim 10, wherein the heat sink clips accommodate a plurality of component package sizes.

12. The self-contained automatic battery charging system of claim 1, further comprising system executable definitions for system-specific functions that enable a user of the self-contained automatic battery charging system to implement an NFPA-110-compliant interface using information obtained via SAE J1939 standards.

13. The self-contained automatic battery charging system of claim 12, wherein implementation of the NFPA-110-compliant interface using information obtained via SAE J1939 standards is carried out without additional hardware and wiring associated with dedicated meters and/or alarm relays.

14. A method comprising:
   inputting an alternating current (AC) power to a first switchmode converter, the first switchmode converter converting AC input power into a direct current (DC) power and providing the first switchmode converter configured to provide active power factor correction so as to provide an improved power factor, the first switchmode converter comprising a high frequency isolation transformer to provide an electrical isolation between a primary circuitry and a secondary circuitry of a self-contained automatic battery charging system; and
   outputting a DC output from the first switchmode converter to an input of a second switchmode converter, the second switchmode converter regulating an output voltage and limiting an output current to an electrical load.

15. The method of claim 14, wherein the providing an active power factor correction comprises controlling an amount of electric current flowing into the first switchmode converter to maintain a sinusoidal waveform in phase with an input voltage waveform to provide the active power factor correction.

16. The method of claim 14, further comprising electrically coupling an accessory printed circuit board (PCB) to a power PCB that includes the first switchmode converter and the second switchmode converter to provide an LCD display, one or more alarm output relays, and/or a controller area network bus (CANbus) interface.

17. The method of claim 14, further comprising detecting an overcurrent charging condition for a predetermined period of time and resultantly performing a restart.

18. The method of claim 17, wherein a failure of the restart results in a system lock out, in a fault mode, thereby disabling the self-contained automatic battery charging system.

19. The method of claim 14, further comprising selectively drawing operating housekeeping supply power from a connected battery or from an AC input power.

20. The method of claim 14, further comprising:
charging a connected battery at a low current until the connected battery reaches a threshold voltage; and
increasing the low current to a predetermined maximum allowed current upon the connected battery reaching the threshold voltage.

21. The method of claim 14, further comprising:
increasing the output current; and
shutting down and locking off charging after a predetermined time of operation if DC voltage does not exceed a pre-determined safe value.

22. The method of claim 14, further comprising:
detecting a voltage higher than a predetermined voltage for a connect battery and another electrical storage device being charged; and
shutting down and locking off charging.

\* \* \* \* \*